(12) United States Patent
Smalley

(10) Patent No.: US 10,673,549 B1
(45) Date of Patent: Jun. 2, 2020

(54) ADVERTISING MEASUREMENT AND CONVERSION MEASUREMENT FOR RADIO SYSTEMS

(71) Applicant: DTS, Inc., Calabasas, CA (US)

(72) Inventor: Jason Smalley, Woodland Hills, CA (US)

(73) Assignee: DTS, Inc., Calabasas, CA (US)

( * ) Notice: Subject to any disclaimer, the term of this patent is extended or adjusted under 35 U.S.C. 154(b) by 0 days.

(21) Appl. No.: 16/204,515

(22) Filed: Nov. 29, 2018

(51) Int. Cl.
| | |
|---|---|
| *H04H 60/02* | (2008.01) |
| *H04L 29/06* | (2006.01) |
| *H04W 4/029* | (2018.01) |
| *H04H 60/31* | (2008.01) |
| *H04H 20/57* | (2008.01) |
| *H04M 1/725* | (2006.01) |

(52) U.S. Cl.
CPC ............ *H04H 60/02* (2013.01); *H04H 20/57* (2013.01); *H04H 60/31* (2013.01); *H04L 65/4076* (2013.01); *H04L 65/80* (2013.01); *H04W 4/029* (2018.02); *H04H 2201/183* (2013.01); *H04H 2201/20* (2013.01); *H04M 1/72558* (2013.01)

(58) Field of Classification Search
CPC ........ H04H 60/82; H04H 60/37; H04H 60/17; H04H 60/27; H04H 40/18; H04H 60/16; H04H 60/40; H04H 60/43; H04H 60/85; H04H 60/91; H04H 20/14; H04H 40/00; H04H 60/31; H04H 60/73
See application file for complete search history.

(56) References Cited

U.S. PATENT DOCUMENTS

| | | | |
|---|---|---|---|
| 7,313,361 | B2 | 12/2007 | Steelberg et al. |
| 7,315,726 | B2 | 1/2008 | Steelberg et al. |
| 8,099,327 | B2 | 1/2012 | Steelberg et al. |
| 9,330,647 | B1 | 5/2016 | Bay et al. |
| 2005/0159104 | A1 | 7/2005 | Valley et al. |
| 2005/0278736 | A1 | 12/2005 | Steelberg et al. |
| 2006/0282533 | A1 | 12/2006 | Steelberg et al. |
| 2007/0168254 | A1 | 7/2007 | Steelberg et al. |
| 2007/0169146 | A1 | 7/2007 | Steelberg et al. |
| 2008/0021792 | A1 | 1/2008 | Steelberg et al. |

(Continued)

OTHER PUBLICATIONS

"International Application Serial No. PCT/US2019/054185, International Search Report dated Dec. 13, 2019", 2 pgs.

(Continued)

*Primary Examiner* — Keith Ferguson
(74) *Attorney, Agent, or Firm* — Schwegman Lundberg & Woessner, P.A.

(57) ABSTRACT

A system comprises an Internet network interface, and a first server. The first server include a first port operatively coupled to the Internet network interface, a memory, a processor, and a service application for execution by the processor. The service application is configured to receive a digital audio file and associated radio broadcast information via the Internet network interface, obtain an audio file identifier using a segment of the digital audio file, forward the digital audio file to a radio broadcast system according to the radio broadcast information, receive the segment of the digital audio file and associated radio reception information via the internet network interface, and identify the digital audio file and record the radio reception information for the identified digital audio file.

15 Claims, 4 Drawing Sheets

(56) References Cited

U.S. PATENT DOCUMENTS

| | | | |
|---|---|---|---|
| 2008/0167957 A1 | 7/2008 | Steelberg et al. | |
| 2009/0061837 A1* | 3/2009 | Chaudhri | G06F 3/0481 |
| | | | 455/418 |
| 2010/0008586 A1 | 1/2010 | Meyer et al. | |
| 2011/0039492 A1 | 2/2011 | Johnson et al. | |
| 2011/0257772 A1 | 10/2011 | Kerber et al. | |
| 2012/0221687 A1* | 8/2012 | Hunter | G06F 16/435 |
| | | | 709/219 |
| 2012/0317245 A1 | 12/2012 | Mccue et al. | |
| 2013/0013415 A1 | 1/2013 | Steelberg et al. | |
| 2013/0246180 A1 | 9/2013 | Steelberg et al. | |
| 2013/0263719 A1* | 10/2013 | Watterson | G10H 1/42 |
| | | | 84/609 |
| 2014/0336798 A1* | 11/2014 | Emerson | G10L 19/018 |
| | | | 700/94 |
| 2014/0357234 A1* | 12/2014 | Sullivan | H04W 4/06 |
| | | | 455/412.1 |
| 2016/0182192 A1 | 6/2016 | Milbar et al. | |

OTHER PUBLICATIONS

"International Application Serial No. PCT/US2019/054185, Written Opinion dated Dec. 13, 2019", 8 pgs.

Gomes, et al., "Audio watermarking and fingerprinting: For which applications?", In: Journal of New Music Research, [Online] Retrieved from the internet: <https://www.researchgate.net/profile/Eloi_Batlle/publication/228870495_Audio_Watermarking_and_Fingerprinting_For_Which_Applications/links/00463520de029e5cc1000000>, (Mar. 2003), 22 pgs.

\* cited by examiner

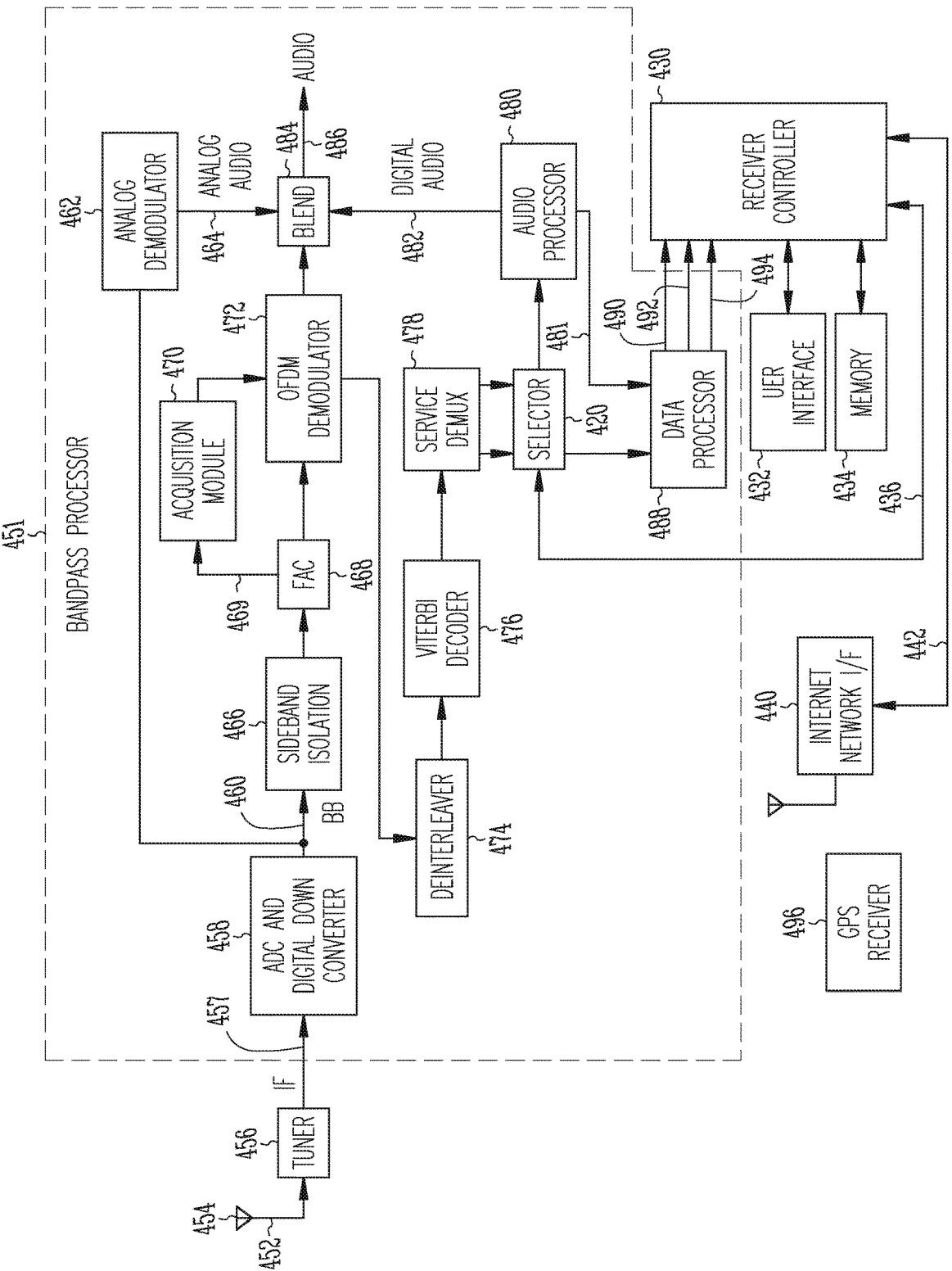

ADVERTISING MEASUREMENT AND CONVERSION MEASUREMENT FOR RADIO SYSTEMS

TECHNICAL FIELD

The technology described in this patent document relates to systems and methods for providing supplemental data (e.g., metadata) that is associated with over-the-air radio broadcast signals.

BACKGROUND

Over-the-air radio broadcast signals are commonly used to deliver a variety of programming content (e.g., audio, etc.) to radio receiver systems. Such over-the-air radio broadcast signals can include conventional AM (amplitude modulation) and FM (frequency modulation) analog broadcast signals, digital radio broadcast signals, or other broadcast signals. Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands.

Service data that includes multimedia programming can be included in IBOC DAB radio. The broadcast of the service data may be contracted by companies to include multimedia content associated with primary or main radio program content. Information related to the play of the multimedia content may be of interest to the companies.

BRIEF DESCRIPTION OF THE DRAWINGS

FIG. 4 is a block diagram of portions of an example in-ban on-channel (IBOC) digital audio broadcast (DAB) receiver.

DESCRIPTION

Figure 1:
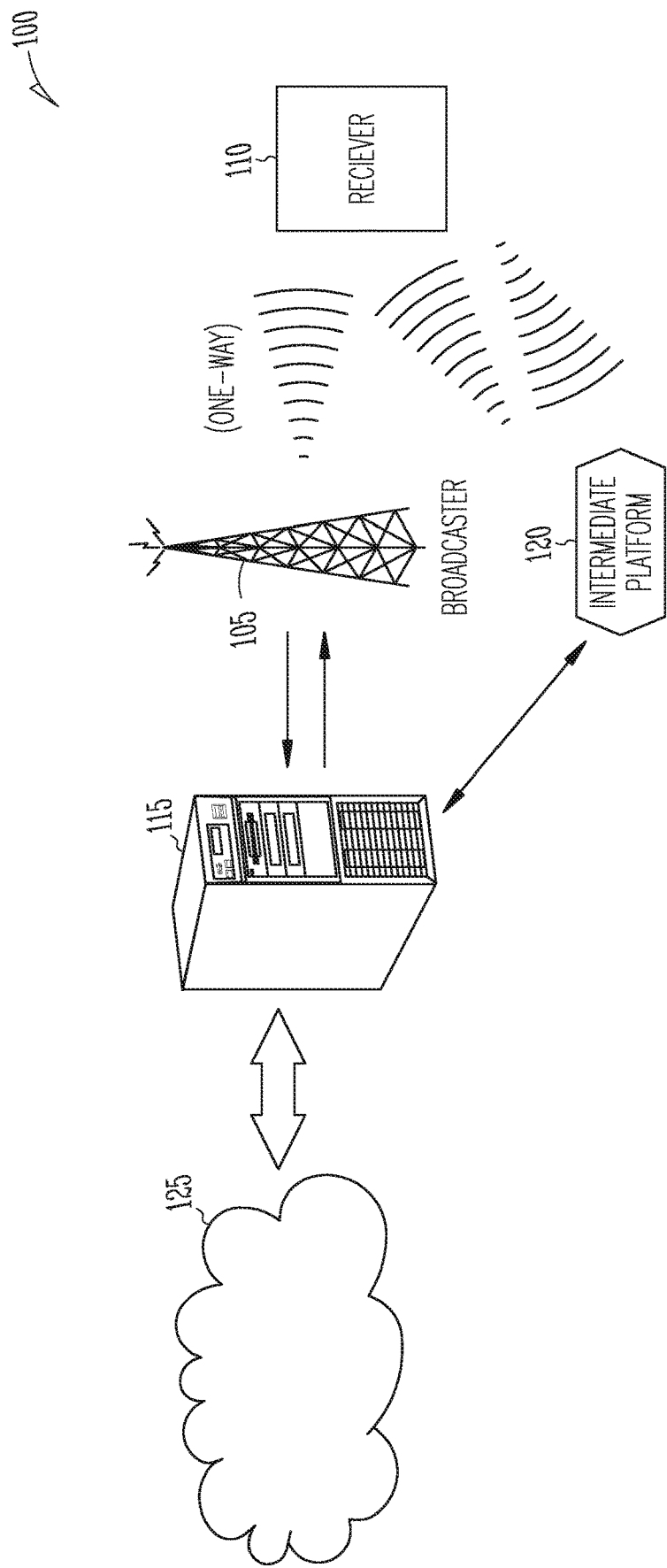
FIG. 1 is an illustration of portions of an example of a radio broadcast system that transmits over-the-air radio broadcast signals to one or more radio broadcast receivers.

Over-the-air radio broadcast signals are commonly used to deliver a variety of programming content (e.g., audio, etc.) to radio receiver systems. Main program service (MPS) data and supplemental program service (SPS) data can be provided to radio broadcast receiver systems. Metadata associated with the programming content can be delivered in the MPS data or SPS data via the over-the-air radio broadcast signals. The metadata can be included in a sub-carrier of the main radio signal. In IBOC radio, the radio broadcast can be a hybrid radio signal that may include a streamed analog broadcast and a digital audio broadcast. Sub-carriers of the main channel broadcast can include digital information such as text or numeric information, and the metadata can be included in the digital information of the sub-carriers. Thus, a hybrid over-the-air radio broadcast can include an analog audio broadcast, a digital audio broadcast, and other text and numeric digital information such as metadata streamed with the over-the-air broadcast. The programming content may be broadcast according to the DAB standard, the digital radio mondiale (DRM) standard, radio data system (RDS) protocol, or the radio broadcast data system (RBDS) protocol.

In IBOC radio, the radio broadcast can also be an all-digital radio broadcast in which primary digital sidebands, and lower-power secondary sidebands in the spectrum vacated by the analog signal, are used to transmit main program service data and supplemental program service data.

Hybrid radio systems can provide a user with an enhanced experience (e.g., an enhanced listening experience) regardless of the type of terrestrial broadcast signal that is received at the user's radio receiver system. For example, conventionally, a user receiving a conventional analog AM or FM radio broadcast signal is provided little, if any, metadata in addition to the received audio (e.g., a user's automotive receiver may display only a song title and artist name). By contrast, hybrid radio enhances the user's experience by providing a variety of different metadata in concert with the primary programming content. For example, users receiving radio broadcast signals at a receiver system may view images, videos, multimedia displays, text, etc., that is related to the programming content received in metadata via the over-the-air radio broadcast signals.

The metadata can include both "static" metadata and "dynamic" metadata. Static metadata changes infrequently or does not change. The static metadata may include the radio station's call sign, name, logo (e.g., higher or lower logo resolutions), slogan, station format, station genre, language, web page uniform resource locator (URL), URL for social media (e.g., Facebook, Twitter), phone number, short message service (SMS) number, SMS short code, program identification (PI) code, country, or other information.

Dynamic metadata changes relatively frequently. The dynamic metadata may include a song name, artist name, album name, artist image (e.g., related to content currently being played on the broadcast), advertisements, enhanced advertisements (e.g., title, tag line, image, phone number, SMS number, URL, search terms), program schedules (image, timeframe, title, artist name, DJ name, phone number, URL), service following data, or other information. When the radio receiver system is receiving an over-the-air radio broadcast signal from a particular radio station, the receiver system may receive both static metadata and dynamic metadata.

It is desirable for companies, advertisers, and radio stations to have a means to independently track the play of their advertisements and to track the impact of the advertisements on listeners. This feedback would allow the companies, advertisers, and radio stations to better allocate their advertising resources.

The following description and the drawings sufficiently illustrate specific embodiments to enable those skilled in the art to understand the specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims.

FIG. 1 is an illustration of portions of an example of a radio broadcast system that transmits over-the-air radio broadcast signals to one or more radio broadcast receivers. The system 100 provides an information infrastructure to track the playing of advertisements and the impact of the advertisements on radio listeners. The information generated by the radio system can be accessible by third parties, such as an advertising agency, a company that has engaged the advertising agency, or a radio station engaged to place advertisements in the radio broadcast.

The system 100 includes a radio broadcast transmitter 105 that transmits an over-the-air radio broadcast signal to a radio broadcast receiver 110. The over-the-air radio broadcast is a one-way broadcast that can include a hybrid IBOC radio signal or an all-digital IBOC radio signal. The system 100 also includes a service controller 115. The service controller 115 can be a server that can send formatted digital data suitable for transmission by the radio broadcast transmitter 105. The service controller 115 can also communicate data with the radio broadcast receiver 110 over an intermediate communication platform 120 such as, among other things, a telematics network, the Internet, or a cellular network.

Third parties can upload advertisement files for placement in the over-the-air radio broadcast. The advertisement files can be uploaded to the service controller 115 using the intermediate communication platform 120 or the cloud 125. The radio broadcast receiver 110 returns information related to the playing of advertisements by the radio broadcast receiver 110 to the service controller 115 via the intermediate communication platform 120. The service controller 115 can process the information (e.g., to perform analytics on the information) which can be uploaded by third parties. In certain embodiments, the service controller 115 can store the returned information in association with the advertisement files. The returned information can be downloaded by third parties to perform the analytics.

Figure 2:
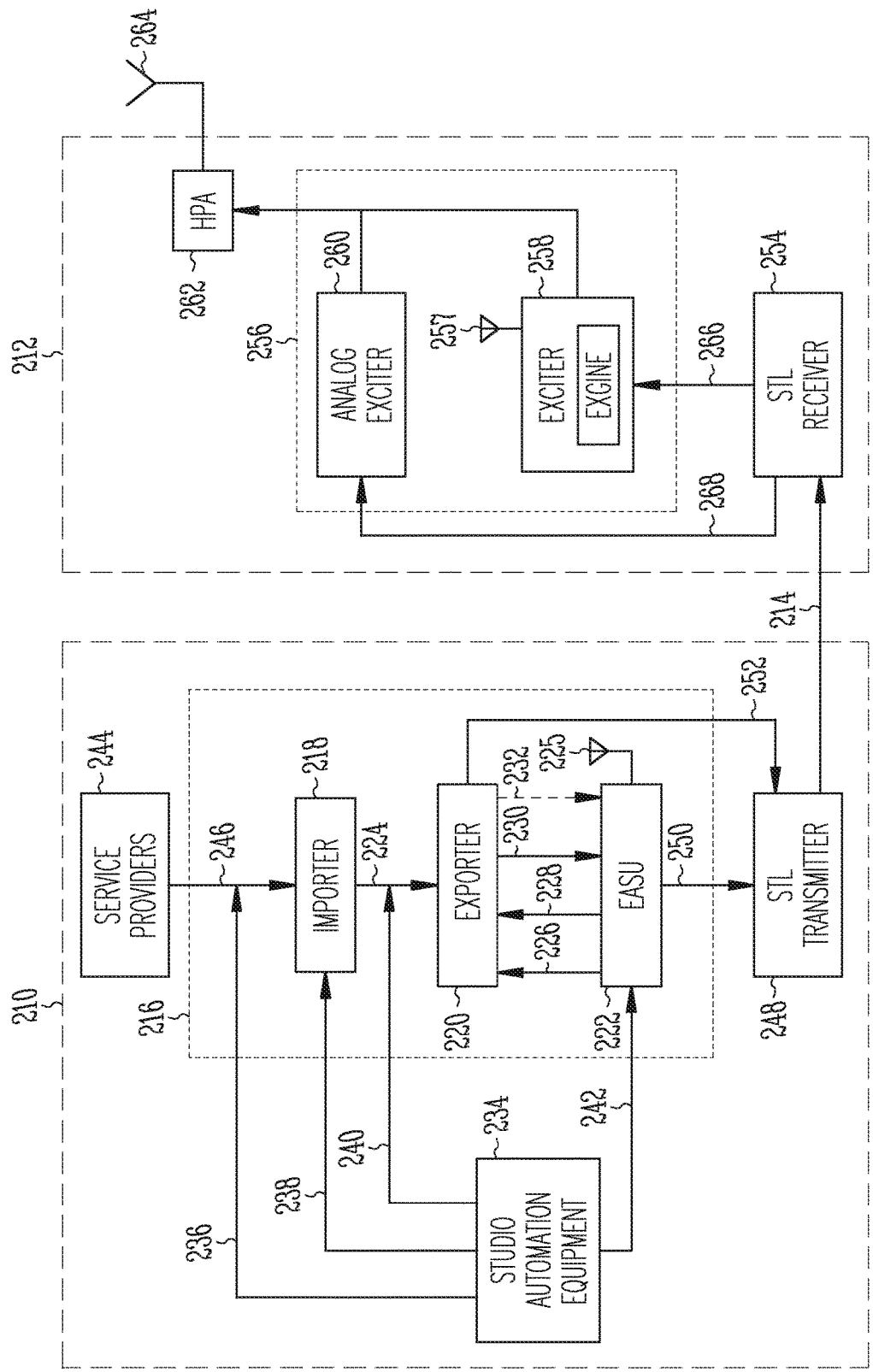
FIG. 2 is a functional block diagram of a portion of an example of the components of a studio site, an FM transmitter site, and a studio transmitter link.

FIG. 2 is a functional block diagram of a portion of an example of the components of a studio site 210, an FM transmitter site 212, and a studio transmitter link (STL) 214 that can be used to broadcast an FM IBOC DAB signal. The studio site includes, among other things, studio automation equipment 234, an Ensemble Operations Center (EOC) 16 that includes an importer 218, an exporter 220, an exciter auxiliary service unit (EASU) 222, and an STL transmitter 248. The transmitter site includes an STL receiver 254, a digital exciter 256 that includes an exciter engine (exgine) subsystem 258, and may include an analog exciter 260. While in FIG. 2, the exporter is resident at a radio station's studio site and the exciter is located at the transmission site, these elements may be co-located at the transmission site.

At the studio site, the studio automation equipment 234 supplies MPS audio 242 to the EASU, MPS data 240 to the exporter, SPS audio 238 to the importer, and SPS data 236 to the importer. MPS audio serves as the main audio programming source. In hybrid radio modes, it preserves the existing analog radio programming formats in both the analog and digital transmissions. MPS data, also known as program service data (PSD), includes information such as music title, artist, album name, etc. Supplemental program service can include supplementary audio content (SPS audio) as well as program-associated data (SPS data).

The importer contains hardware and software for supplying advanced application services (AAS). A "service" is content that is delivered to users via an IBOC DAB broadcast, and AAS can include any type of data that is not classified as MPS, SPS, or Station Information Service (SIS). SIS provides station information, such as call sign, absolute time, position correlated to GPS, etc. Examples of AAS data include real-time traffic and weather information, navigation map updates or other images, electronic program guides, multimedia programming, other audio services, and other content. The content for AAS can be supplied by service providers 244, which provide service data 246 to the importer via an application program interface (API). The service providers 244 may be a broadcaster located at the studio site or externally sourced third-party providers of services and content.

The importer 218 can establish session connections between multiple service providers. The importer 218 encodes and multiplexes service data 246, SPS audio 238, and SPS data 236 to produce exporter link data 224, which is output to the exporter via a data link. One or both of the studio automation equipment 234 and importer 218 can be included in the service controller 115 of FIG. 1. In certain embodiments, one or both of the studio automation equipment 234 and importer 218 can be included in one or more servers. Metadata can be included in one or more of the SPS audio, SPS data, or AAS data.

The exporter 220 contains the hardware and software necessary to supply the main program service and SIS for broadcasting. The exporter accepts digital MPS audio 226 over an audio interface and compresses the audio. The exporter also multiplexes MPS data 240, exporter link data 224, and the compressed digital MPS audio to produce exciter link data 252. In addition, the exporter accepts analog MPS audio 228 over its audio interface and applies a pre-programmed delay to the analog audio to produce a delayed analog MPS audio signal 230. This analog audio can be broadcast as a backup channel for hybrid IBOC DAB broadcasts. The delay compensates for the system delay of the digital MPS audio, allowing receivers to blend between the digital and analog program without a shift in time. In an AM transmission system, the delayed analog MPS audio signal 230 is converted by the exporter to a mono signal and sent directly to the STL as part of the exciter link data 252.

The EASU 222 accepts MPS audio 242 from the studio automation equipment, rate converts it to the proper system clock, and may output two copies of the audio signal, one digital (226) and one analog (228). The EASU includes a GPS receiver that is connected to an antenna 225. The GPS receiver allows the EASU to derive a master clock signal, which is synchronized to the exciter's clock by use of GPS units. The EASU provides the master system clock used by the exporter. The EASU is also used to bypass (or redirect) the analog MPS audio from being passed through the exporter in the event the exporter has a catastrophic fault and is no longer operational. The bypassed audio 232 can be fed directly into the STL transmitter, eliminating a dead-air event.

STL transmitter 248 receives delayed analog MPS audio 250 and exciter link data 252. It outputs exciter link data and delayed analog MPS audio over STL link 214, which may be either unidirectional or bidirectional. The STL link may be a digital microwave or Ethernet link, for example, and may use the standard User Datagram Protocol or the standard TCP/IP.

The transmitter site includes an STL receiver 254, an exciter 256 and an analog exciter 260. The STL receiver 254 receives exciter link data, including audio and data signals as well as command and control messages, over the STL link 214. The exciter link data is passed to the exciter 256, which produces the IBOC DAB waveform. The exciter includes a host processor, digital up-converter, RF up-converter, and exgine subsystem 258. The exgine accepts exciter link data and modulates the digital portion of the IBOC DAB waveform. The digital up-converter of exciter 256 converts from digital-to-analog the baseband portion of the exgine output. The digital-to-analog conversion is based on a GPS clock, common to that of the exporter's GPS-based clock derived from the EASU. Thus, the exciter 256 can include a GPS unit and antenna 257.

Figure 3:
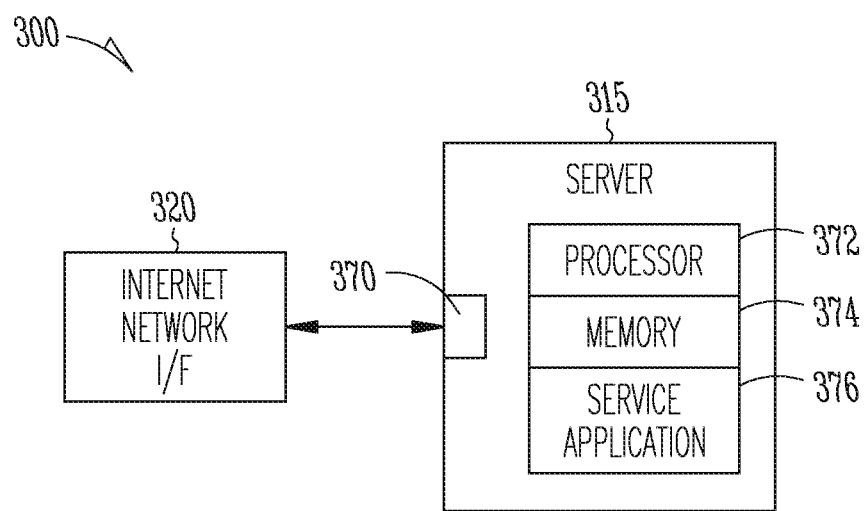
FIG. 3 is a block diagram of a system for processing audio files for radio broadcast.

FIG. 3 is a block diagram of a system for processing audio files for radio broadcast. The system 300 includes a server 315 and an Internet network interface 320 (I/F). The Internet network interface 320 can be an interface to the cloud 125 in FIG. 1 or an interface to the intermediate communication platform 120 in FIG. 1. The server 315 may perform one or more of the functions of the studio automation equipment 234 or importer 218 shown in FIG. 2. The server 315 includes a first port 370 operatively coupled to the Internet network interface 320. In certain embodiments, the Internet network interface 320 includes an Internet access point (e.g., a modem), and the port 370 can include (among other options) a communication (COMM) port, or a universal serial bus (USB) port.

The server 315 also includes a processor 372, a memory 374, and a service application 376 for execution by the processor 372. The service application 376 can comprise software that operates using the operating system software of the server 315. The service application 376 receives a digital audio file and associated radio broadcast information via the Internet network interface. The content of the digital audio file can be an advertisement or other audio for play in association with a radio broadcast.

The radio broadcast information received with the digital audio file can include one or more of a date of the radio broadcast of the digital audio file and a geographical region where the digital audio file is to be broadcast. The radio broadcast information can also include one or more identifiers of radio broadcasters to broadcast the digital audio file. The radio broadcast information can further include a date range for which radio reception information is collected at the radio receivers and returned. The digital audio file and radio broadcast information may be uploaded to the server 315 by a company, advertiser, or radio station using a telematics network, the Internet, a cellular network, or cloud. In certain embodiments, the digital audio file and associated radio broadcast information is uploaded by a service provider.

The service application 376 obtains an audio file identifier using a segment of the digital audio file. As an illustrative example intended to be non-limiting, the audio file identifier may include a digital fingerprint for the digital audio file or a digital watermark for the digital audio file. The service application 376 may store the audio file identifier (e.g., in memory 374).

In certain embodiments, the service application 376 produces the audio file identifier. In other embodiments, the service application 376 sends the digital audio file to a second server (e.g., via the cloud 125 in FIG. 1), and receives the audio file from a second server. The term "cloud" is used herein to refer to a hardware abstraction. Instead of one dedicated server processing the digital audio file and returning the audio file identifier (e.g., the digital fingerprint or the digital watermark), sending the digital audio file to the cloud can include sending the digital audio file to a data center or processing center. The actual server used to process the digital audio file is interchangeable at the data center or processing center.

The service application 376 forwards the digital audio file to a radio broadcast system for broadcast according to the radio broadcast information. In certain embodiments, the service application 376 includes the digital audio file in SPS audio, SPS data, or AAS data and forwards the digital audio file in metadata to an exporter of the radio broadcast system. The server may include a second port (not shown) operatively coupled to the exporter. In certain embodiments, the service application 376 forwards the digital audio file to the radio broadcast system via the Internet interface. The digital audio file is received at a radio broadcast transmitter site according to one or more of a radio station identifier, a geographical location, or a date for the broadcast. The digital audio file can then be broadcast such as by using an IBOC DAB radio signal for reception by radio receivers.

One or more radio receivers that receive the digital audio file extract the digital audio segment used to produce the audio file identifier. The radio receivers send the digital audio segment with associated radio reception information back to the server 315. The radio receivers may send the digital audio segment and radio reception information using the intermediate communication platform 120 or the cloud 125 in FIG. 1. The server may receive the digital audio segment and radio reception information via the Internet network interface 320. The service application 376 identifies the digital audio file using the received file segment. To identify the digital audio file, the audio file identifier can be re-obtained by service application 376 by reproducing the audio file identifier or using a service to reproduce the audio file identifier. The service application records the radio reception information for the identified digital audio file.

The radio reception information is information collected by a radio receiver in response to receiving the digital audio file. The radio reception information can be collected when the digital audio file is received and played by the radio receiver. In certain embodiments, the radio receiver may include multiple tuners and may be able to initiate collecting of the radio reception information without the digital audio file being played by the user of the radio receiver. The radio reception information can be collected when one of the multiple tuners is tuned to the broadcast and the radio receiver receives the digital audio file or the segment of the digital audio file.

The radio reception information can include one or more of the Internet protocol (IP) address of the radio receiver, an identifier of the radio station from which the radio receiver received the digital audio file segment, a date the radio receiver received the digital audio file segment, a time the radio receiver received the digital audio file segment, global positioning system (GPS) coordinates of the radio receiver location when receiving the digital audio file segment, and GPS coordinates of one or more locations of the radio receiver following the reception of the digital audio file segment.

The radio reception information can be recorded by storing the information in memory in association with the audio file identifier. A user can then access the radio reception information for the digital audio file from storage. The user may be a company that engaged an advertiser or radio station to implement an advertising campaign over broadcast radio. The company can use the radio reception information to independently determine the success of advertising campaigns without relying on the advertisers or the radio stations that are compensated for running the advertising campaigns.

Radio reception information received from multiple radio receivers can be used to create a database of advertisements that were received and played, and correlating the time, date and number of listeners. The information can be collected regionally or nationally. This correlated data can be used to determine the success of an advertising campaign. For example, the success of an advertising campaign can be determined based on the number of radio receivers that were tuned to the broadcast and received the advertisement. This can be determined using the number of copies of the audio file data segments received or the number of Internet protocol (IP) addresses received. The advertising campaign can be optimized by determining the date, time, radio station, and location that were associated with the most receptions of the digital audio file.

In another example, the success of an advertising campaign can be determined based on subsequent actions by the users of the radio receivers as recorded in the radio reception information. The metadata that includes the digital audio file may also include purchase information that can be displayed on the radio receivers. The radio receivers may include a user interface that enables users to make purchases via the intermediate platform. The IP addresses of the radio reception information can be correlated with the IP addresses of the purchase information to determine a measure of success of the advertising campaign. This correlation data may be produced by the service application and stored (e.g., in the server memory), or the correlation data may be determined by another device after radio reception information is downloaded from memory.

In another example, the radio broadcast information can include GPS coordinates of one or more locations related to the content of the digital audio file. These may be locations to purchase goods or services related to the content of the digital audio file, such as participating stores for example. The radio reception information can include GPS coordinates of one or more locations of a radio receiver following reception of the digital audio file segment by the radio receiver. Correlating the GPS coordinates of the radio broadcast information with the subsequent GPS coordinates of the radio reception information can indicate the number of users that acted on the advertising of the digital audio file by visiting the locations of the broadcast coordinates. The time between playing the audio digital file and the arrival at the broadcast coordinates may also be recorded. Again, this correlation data may be produced using the service application and stored, or the correlation data may be determined by another device after radio reception information is downloaded from memory. In certain embodiments, upon reception of the digital audio file segment, the service application forwards previously received radio reception information associated with the digital audio file to the source that uploaded the digital audio file to the server.

The radio reception information received by the server can be used to target additional advertising to the users of the radio receivers. Based on the IP address of a radio receiver and the reception of the digital audio file, the service application 376 may select an additional digital audio file to forward to the radio receiver via the Internet network interface 320. The service application may also select the additional digital audio file using one or both of purchase information and GPS coordinates of the radio receiver.

In another example, the radio receiver identifies and selects the additional advertising played to the user. The radio receiver may select certain advertisements within the radio broadcast signal for replacement by other advertisements in the radio broadcast. The replacement advertisements may be local digital audio that replaces the advertisements in the broadcast. The radio receiver may identify the advertisements to be replaced based on instructions received from the service application 376. The advertisements to be replaced may be identified based on the audio file identifiers or the radio receiver may perform analysis of the broadcast signal to identify the advertisements to be replaced. The replacement advertisements may be pre-delivered to the radio receivers by the service application based on the radio broadcast information or the radio reception information sent by the radio receiver. In certain examples, the radio receiver stores digital audio files sent by the service application 376. To the listener of the radio receiver, the replacement advertisements would appear to be integrated into the radio broadcast and the audio output of the radio receiver.

FIG. 4 is a block diagram of portions of an example IBOC DAB receiver. The radio receiver 400 may be a component of the radio broadcast receiver 110 shown in FIG. 1. The radio receiver 400 includes a wireless Internet network interface for receiving metadata via wireless IP and other components for receiving over-the-air radio broadcast signals. The Internet network interface 440 and receiver controller 430 may be collectively referred to as a wireless internet protocol hardware communication module of the radio receiver.

The radio receiver 400 includes radio frequency (RF) receiver circuitry including tuner 456 that has an input 452 connected to an antenna 454. The antenna 454, tuner4, and baseband processor 451 may be collectively referred to as an over-the-air radio broadcast hardware communication module.

Within the baseband processor 451, an intermediate frequency signal 457 from the tuner 456 is provided to an analog-to-digital converter and digital down converter 458 to produce a baseband signal at output 460 comprising a series of complex signal samples. The signal samples are complex in that each sample comprises a "real" component and an "imaginary" component. An analog demodulator 462 demodulates the analog modulated portion of the baseband signal to produce an analog audio signal on line 464. The digitally modulated portion of the sampled baseband signal is filtered by isolation filter 466, which has a pass-band frequency response comprising the collective set of subcarriers $f_1$-$f_n$ present in the received OFDM signal. First adjacent canceller (F AC) 468 suppresses the effects of a first-adjacent interferer. Complex signal 469 is routed to the input of acquisition module 470, which acquires or recovers OFDM symbol timing offset/error and carrier frequency offset/error from the received OFDM symbols as represented in received complex signal 469. Acquisition module 470 develops a symbol timing offset $\Delta t$ and carrier frequency offset $\Delta f$, as well as status and control information. The signal is then demodulated (block 472) to demodulate the digitally modulated portion of the baseband signal. The digital signal is de-interleaved by a de-interleaver 474, and decoded by a Viterbi decoder 476. A service de-multiplexer 478 separates main and supplemental program signals from data signals. The supplemental program signals may include a digital audio file received in an IBOC DAB radio broadcast signal.

The wireless Internet network interface may be managed by the receiver controller 430. As illustrated in FIG. 2, the Internet network interface 440 and the receiver controller 430 are operatively coupled via a line 442, and data transmitted between the Internet network interface 440 and the receiver controller 430 is sent over this line 442. A selector 420 may connect to receiver controller 430 via line 436 to select specific data received from the Internet network interface 440. The data may include metadata (e.g., text, images, video, etc.), and may be rendered at substantially the same time that primary or supplemental programming content received over-the-air in the IBOC DAB radio signal is rendered.

An audio processor 480 processes received signals to produce an audio signal on line 482 and MPSD/SPSD 481. In embodiments, analog and main digital audio signals are blended as shown in block 484, or the supplemental program signal is passed through, to produce an audio output on line 486. A data processor 488 processes received data signals and produces data output signals on lines 490, 492, and 494. The data lines 490, 492, and 494 may be multiplexed together onto a suitable bus such as an I²c, SPI, UART, or USB. The data signals can include, for example, data representing the metadata to be rendered at the radio receiver.

The receiver controller 430 receives and processes the data signals. The receiver controller 430 may include a microcontroller that is operatively coupled to the user interface 432 and memory 434. The microcontroller may be an 8-bit RISC microcontroller, an advanced RISC machine 32-bit microcontroller, or any other suitable microcontroller. Additionally, a portion or all of the functions of the receiver controller 430 could be performed in a baseband processor (e.g., the audio processor 480 and/or data processor 488). The user interface 432 may include input/output (I/O) processor that controls the display, which may be any suitable visual display such as an LCD or LED display. In certain embodiments, the user interface 432 may also control user input components via a touch-screen display. In certain embodiments, the user interface 432 may also control user input from a keyboard, dials, knobs or other suitable inputs. The memory 434 may include any suitable data storage medium such as RAM, Flash ROM (e.g., an SD memory card), and/or a hard disk drive. The radio receiver 400 also includes a GPS receiver 496 to receive GPS coordinates.

As explained previously herein, a digital audio file can be received via the RF receiver circuitry. The digital audio file can be processed as SPS audio, SPS data, or AAS data. The receiver controller 430 initiates play of the digital audio file in response to an input received via the user interface 432. The receiver controller 430 also sends a segment of digital audio file and associated radio reception information to a destination via the Internet network interface 440.

The receiver controller 430 collects the radio reception information and may forward the information to a service controller 115 as in FIG. 1. Some examples of the radio reception information were described previously herein, and can include GPS coordinates received after the digital audio file is played at the receiver.

The radio receiver 400 may receive an additional digital audio file via the Internet network interface 440. The additional digital audio file may be received from a radio broadcast system in response to sending the radio reception information. The receiver controller 430 may initiate play of the additional digital audio file when it is received. In certain embodiments, the receiver controller 430 may store the additional audio file in memory 434. The radio controller may initiate play of the additional digital audio file according to the collected radio reception information. For example, the additional digital audio file may be played when certain GPS coordinates are received by the GPS receiver 496. In another example, the additional digital audio file may be played based on purchase information entered into the radio receiver. In a further example, digital audio file may be played in place of an advertisement contained within the broadcast signal.

The systems, devices, and methods described permit companies, advertisers, and radio stations a means to independently track the play of radio advertisements in particular regions or nationally. Information collected by the systems, devices, and methods can be useful to track the listenership of the certain radio advertisements and the listener impressions of certain radio advertisements. The information can be processed independent of third parties that may have a compensation interest in the reporting. The information allows the third parties to independently track consumer conversion of certain radio advertisements in particular regions or nationally by identifying the number of consumers who listened to the radio broadcast of the advertisements and went to a certain geographical location associated with the advertisement. The information also may be helpful to target additional advertising to be served to the consumers. It can be seen upon reading the detailed description that the systems, devices, and methods can allow for improved allocation of advertising resources.

Additional Examples and Disclosure

Example 1 can include subject matter (such as a system for processing audio files for radio broadcast) comprising an Internet network interface and a first server. The first server includes a first port operatively coupled to the Internet network interface, a memory, a processor, and a service application for execution by the processor. The service application is configured to receive a digital audio file and associated radio broadcast information via the Internet network interface; obtain an audio file identifier using a segment of the digital audio file; forward the digital audio file to a radio broadcast system according to the radio broadcast information; receive the segment of the digital audio file and associated radio reception information via the internet network interface; and identify the digital audio file and record the radio reception information for the identified digital audio file.

In Example 2, the subject matter of Example 1 optionally includes a service application configured to receive associated radio broadcast information that includes one or more of a date of the radio broadcast of the digital audio file; a geographical region where the digital audio file is to be broadcast; and one or more identifiers of radio broadcasters to broadcast the digital audio file.

In Example 3, the subject matter of one or both of Examples 1 and 2 optionally includes a service application configured to receive associated radio broadcast information that includes one or more of an Internet protocol address of a radio receiver that received digital audio file segment; an identifier of the radio station from which the radio receiver received the digital audio file segment; a date the radio receiver received the digital audio file segment; a time the radio receiver received the digital audio file segment; global positioning system (GPS) coordinates of the radio receiver location when receiving the digital audio file segment; and GPS coordinates of one or more locations of the radio receiver following reception of the digital audio file segment.

In Example 4, the subject matter of one or any combination of Examples 1-3 optionally includes a service application configured to receive associated radio broadcast information that includes GPS coordinates of one or more locations related to the content of the digital audio file, and the associated radio reception information includes GPS coordinates of one or more locations of a radio receiver following reception of the digital audio file segment by the radio receiver. The service application is optionally configured to produce correlation data that correlates the locations related to the content of the digital audio file to the locations of the radio receiver and store the produced correlation data.

In Example 5, the subject matter of one or any combination of Examples 1-4 optionally includes a service application configured to send the digital audio file to a second server, and receive from the second server, as the audio file identifier, one or both of a digital fingerprint for the digital audio file and a watermark for the digital audio file.

In Example 6, the subject matter of one or any combination of Examples 1-5 optionally includes a service application configured to select an additional digital audio file using the associated radio reception information, and forward the additional digital audio file to a radio receiver via the Internet interface.

In Example 7, the subject matter of one or any combination of Examples 1-6 optionally includes a service application configured to forward previously received radio reception information associated with the digital audio file to a source of digital audio file upon reception of the digital audio file.

In Example 8, the subject matter of one or any combination of Examples 1-7 optionally includes a service application is configured to forward the digital audio file to the radio program broadcaster via the Internet network interface.

Example 9 includes subject matter (such as a radio receiver), or can optionally be combined with one or any combination of Examples 1-8 to include such subject matter, comprising radio frequency (RF) receiver circuitry configured to receive a radio broadcast signal that includes a digital audio file; an Internet network interface; a user interface; and a receiver controller. The receiver controller is configured to initiate play of the digital audio file in response to an input received via the user interface; and send a digital audio file segment and associated radio reception information to a destination via the Internet network interface.

In Example 10, the subject matter of Example 9 optionally includes a receiver controller configured to send associated radio reception information that includes one or more of an Internet protocol address of the radio receiver that played the digital audio file segment; an identifier of the radio station from which the radio receiver received the digital audio file segment; a date the radio receiver played the digital audio file segment; a time the radio receiver played the digital audio file segment; and global positioning system (GPS) coordinates of the radio receiver location when playing the digital audio file segment.

In Example 11, the subject matter of one or both of Examples 9 and 10 optionally includes a receiver controller configured to send associated radio reception information that includes GPS coordinates of one or more locations of the radio receiver following reception of the digital audio file segment.

In Example 12, the subject matter of one or any combination of Examples 9-11 optionally includes RF receiver circuitry configured to receive an in-band on-channel (IBOC) digital audio broadcasting (DAB) radio broadcast signal.

In Example 13, the subject matter of one or any combination of Examples 9-12 optionally includes a memory. The receiver controller is optionally configured to store an additional digital audio file received via the Internet network interface in the memory, and initiate play of the additional digital audio file received via the Internet network interface.

In Example 14, the subject matter of Example 13 optionally includes a receiver controller configured to selectively initiate the play of the additional digital audio file received via the Internet network interface according to the radio reception information.

Example 15 includes subject matter (such as a computer readable storage medium including instructions that, when performed by processing circuitry of a computing device, cause the computing device to perform acts), or can optionally be combined with the subject matter of one or any combination of Examples 1-14 to include such subject matter, comprising receiving, at the computing device, a digital audio file and associated radio broadcast information via an Internet network; obtaining an audio file identifier using a segment of the digital audio file; forwarding the digital audio file to a radio program broadcasting system according to the associated radio broadcast information; receiving the segment of the digital audio file and associated radio reception information via the Internet network; and identifying the digital audio file and recording the radio reception information for the identified digital audio file.

In Example 16, the subject matter of Example 15 optionally includes instructions that cause the processing circuitry to perform acts comprising receiving associated broadcast information that includes one or more of: a date of the broadcast of the digital audio file; a geographical region where the digital audio file is to be broadcast; and one or more identifiers of radio broadcasters to broadcast the digital audio file.

In Example 17, the subject matter of one or both of Examples 15 and 16 optionally includes instructions that cause the processing circuitry to perform acts comprising: receiving associated radio reception information that includes one or more of: an Internet protocol (IP) address of a radio receiver that received digital audio file segment; an identifier of the radio station from which the radio receiver received the digital audio file segment; a date the radio receiver received the digital audio file segment; a time the radio receiver received the digital audio file segment; global positioning system (GPS) coordinates of the radio receiver location when receiving the digital audio file segment; and GPS coordinates of one or more locations of the radio receiver following reception of the digital audio file segment.

In Example 18, the subject matter of one or any combination of Examples 15-17 optionally includes instructions that cause the processing circuitry to perform acts comprising: receiving GPS coordinates of one or more locations related to the content of the digital audio file; receiving GPS coordinates of one or more locations of the radio receiver following reception of the digital audio file segment; and producing correlation data that correlates the locations related to the content of the digital audio file to the locations of the radio receiver, and storing the produced correlation data.

In Example 19, the subject matter of one or any combination of Examples 15-18 optionally includes instructions that cause the processing circuitry to perform acts comprising: sending the digital audio file to a second computing device; and receiving from the second computing device, as the audio file identifier, at least one of a digital fingerprint for the digital audio file or a watermark for the digital audio file.

In Example 20, the subject matter of one or any combination of Examples 15-19 optionally includes instructions that cause the processing circuitry to perform acts comprising: selecting an additional digital audio file according to the received associated radio reception information, and forwarding the additional digital audio file to a radio receiver via the Internet network.

In Example 21, the subject matter of one or any combination of Examples 15-20 optionally includes instructions that cause the processing circuitry to perform acts comprising: receiving the digital audio file via the Internet network from a network source for radio broadcast; and forwarding previously received radio reception information associated with the received digital audio file to the network source of the digital audio file in response to the reception of the digital audio file via the Internet network.

These non-limiting examples can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, the subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. A system for processing audio files for radio broadcast, the system comprising:
   an Internet network interface; and
   a first server including: a first port operatively coupled to the Internet network interface, a memory, a processor, and a service application for execution by the processor, wherein the service application is configured to:
      receive a digital audio file and associated radio broadcast information via the Internet network interface;
      obtain an audio file identifier using a segment of the digital audio file;
      forward the digital audio file to a radio broadcast system according to the radio broadcast information;
      receive the segment of the digital audio file and associated radio reception information via the internet network interface; and
      identify the digital audio file and record the radio reception information for the identified digital audio file.

2. The system of claim 1, wherein the associated radio broadcast information includes one or more of:
   a date of the radio broadcast of the digital audio file;
   a geographical region where the digital audio file is to be broadcast; and
   one or more identifiers of radio broadcasters to broadcast the digital audio file.

3. The system of claim 1, wherein the associated radio reception information includes one or more of:
   an Internet protocol address of a radio receiver that received digital audio file segment;
   an identifier of the radio station from which the radio receiver received the digital audio file segment;
   a date the radio receiver received the digital audio file segment;
   a time the radio receiver received the digital audio file segment;
   global positioning system (GPS) coordinates of the radio receiver location when receiving the digital audio file segment; and
   GPS coordinates of one or more locations of the radio receiver following reception of the digital audio file segment.

4. The system of claim 1,
   wherein the associated radio broadcast information includes GPS coordinates of one or more locations related to the content of the digital audio file, and the associated radio reception information includes GPS coordinates of one or more locations of a radio receiver following reception of the digital audio file segment by the radio receiver; and
   wherein the service application is configured to produce correlation data that correlates the locations related to the content of the digital audio file to the locations of the radio receiver, and store the produced correlation data.

5. The system of claim 1, wherein the service application is configured to send the digital audio file to a second server, and receive from the second server, as the audio file identifier, one or both of a digital fingerprint for the digital audio file and a watermark for the digital audio file.

6. The system of claim 1, wherein the service application is configured to select an additional digital audio file using the associated radio reception information, and forward the additional digital audio file to a radio receiver via the Internet interface.

7. The system of claim 1, wherein the service application is configured to forward previously received radio reception information associated with the digital audio file to a source of digital audio file upon reception of the digital audio file.

8. The system of claim 1, wherein the service application is configured to forward the digital audio file to the radio program broadcaster via the Internet network interface.

9. A non-transitory computer readable storage medium including instructions that, when performed by processing circuitry of a computing device, cause the computing device to perform acts comprising:

receiving, at the computing device, a digital audio file and associated radio broadcast information via an Internet network;

obtaining an audio file identifier using a segment of the digital audio file;

forwarding the digital audio file to a radio program broadcasting system according to the associated radio broadcast information;

receiving the segment of the digital audio file and associated radio reception information via the Internet network; and identifying the digital audio file and recording the radio reception information for the identified digital audio file.

10. The non-transitory computer readable storage medium of claim 9, including instructions that cause the processing circuitry to perform acts comprising receiving associated broadcast information that includes one or more of:

a date of the broadcast of the digital audio file;

a geographical region where the digital audio file is to be broadcast; and one or more identifiers of radio broadcasters to broadcast the digital audio file.

11. The non-transitory computer readable storage medium of claim 9, including instructions that cause the processing circuitry to perform acts comprising receiving associated radio reception information that includes one or more of:

an Internet protocol (IP) address of a radio receiver that received digital audio file segment;

an identifier of the radio station from which the radio receiver received the digital audio file segment;

a date the radio receiver received the digital audio file segment;

a time the radio receiver received the digital audio file segment;

global positioning system (GPS) coordinates of the radio receiver location when receiving the digital audio file segment; and GPS coordinates of one or more locations of the radio receiver following reception of the digital audio file segment.

12. The non-transitory computer readable storage medium of claim 9, including instructions that cause the processing circuitry to perform acts comprising:

receiving GPS coordinates of one or more locations related to the content of the digital audio file;

receiving GPS coordinates of one or more locations of the radio receiver following reception of the digital audio file segment; and producing correlation data that correlates the locations related to the content of the digital audio file to the locations of the radio receiver, and storing the produced correlation data.

13. The non-transitory computer readable storage medium of claim 9, including instructions that cause the processing circuitry to perform acts comprising:

sending the digital audio file to a second computing device; and receiving from the second computing device, as the audio file identifier, at least one of a digital fingerprint for the digital audio file or a watermark for the digital audio file.

14. The non-transitory computer readable storage medium of claim 9, including instructions that cause the processing circuitry to perform acts comprising: selecting an additional digital audio file according to the received associated radio reception information, and forwarding the additional digital audio file to a radio receiver via the Internet network.

15. The non-transitory computer readable storage medium of claim 9, including instructions that cause the processing circuitry to perform acts comprising:

receiving the digital audio file via the Internet network from a network source for radio broadcast; and forwarding previously received radio reception information associated with the received digital audio file to the network source of the digital audio file in response to the reception of the digital audio file via the Internet network.

* * * * *